United States Patent [19]

Olson et al.

[11] 4,373,093

[45] Feb. 8, 1983

[54] RECOVERY OF CHLORINATED POLY(VINYL CHLORIDE)

[75] Inventors: Alan J. Olson, Westlake; Robert G. Vielhaber, Doylestown, both of Ohio

[73] Assignee: The B. F. Goodrich Company, Akron, Ohio

[21] Appl. No.: 219,650

[22] Filed: Dec. 24, 1980

[51] Int. Cl.³ ............................................. C08F 6/00
[52] U.S. Cl. ................................... 528/491; 525/356
[58] Field of Search ........................................ 528/491

[56] References Cited

U.S. PATENT DOCUMENTS

| | | | |
|---|---|---|---|
| 2,481,188 | 9/1949 | Babayan | 525/356 |
| 2,571,901 | 10/1951 | Lawlor | 525/356 |
| 3,062,795 | 11/1962 | Cain | 525/356 |

Primary Examiner—C. A. Henderson

Attorney, Agent, or Firm—Alfred D. Lobo; James R. Lindsay

[57] ABSTRACT

A process is disclosed for recovering chlorinated poly(-vinyl chloride) ("CPVC") which is dissolved in liquid chlorine ("$Cl_2$") to form a CPVC solution. CPVC is recovered by adding the CPVC solution to a halogenated lower alkaline ("HLA"), which is simultaneously an excellent solvent for liquid $Cl_2$ and a very poor solvent for CPVC. This peculiar property causes the CPVC to be precipitated from the three-component mixture as a finely divided solid with different morphological properties than if the HLA was added to the CPVC solution. The solid CPVC precipitated may then be separated from the solution of liquid $Cl_2$ in the HLA. This solution of $Cl_2$ in HLA is further separated into its component liquids, namely HLA and liquid $Cl_2$ which are then each reused.

10 Claims, 1 Drawing Figure

RECOVERY OF CHLORINATED POLY(VINYL CHLORIDE)

BACKGROUND OF THE INVENTION

The recovery of chlorinated poly(vinyl chloride), ("CPVC") in its solid state is generally not a problem because it is produced by the chlorination of solid poly(vinyl chloride) ("PVC") which remains solid both during and after it is chlorinated. Thus, whether the PVC is chlorinated with gaseous chlorine ("$Cl_2$") as a suspension in an inert liquid medium (which liquid does not react with PVC), whether the liquid medium is aqueous or nonaqueous, or whether chlorination is effected either thermally or in the presence of ultraviolet light, the solid CPVC formed is recovered by the relatively simple expedient of separating the solid CPVC from the liquid phase in which the solid CPVC is suspended. Most commercially used CPVC is produced by the chlorination of an aqueous suspension of PVC such as is described in U.S. Pat. No. 2,996,489, and recovery of the solid CPVC is by centrifuging and drying. On the other hand, if PVC is chlorinated in a fluid bed of solids by reaction with gaseous chlorine, the separation problem is avoided altogether.

In a recently discovered process described in copending application Ser. No. 228,538 filed Jan. 28, 1981, now U.S. Pat. No. 4,350,798, the disclosure of which is incorporated by reference thereto as if fully set forth herein, there is described a process for the chlorination of solid PVC in a liquid $Cl_2$ medium which simultaneously serves a three-fold function. Liquid $Cl_2$ provides the medium in which the PVC is suspended; it is the essential reactant which effects chlorination of the PVC, and it is a solvent for the CPVC after it is formed, resulting in a syrup-like solution. The problem arises when one desires to recover the CPVC in solid form. The CPVC must first be precipitated from the solution in solid form, and the solid must then be separated from the liquid.

Chlorination of PVC in solution ("solution chlorination") is well-known. The CPVC is known to be recovered from its solution by evaporation of the solvent leaving a solid hard mass of CPVC which is difficult to pulverize even at relatively low temperatures. To obtain a finely divided solid, the mass of CPVC obtained is preferably dissolved in a solvent such as hot tetrahydrofuran (THF) and recovered from such a solution by concentrating the THF. Still another method of recovering solid finely divided CPVC from its solution in liquid $Cl_2$ is to pour the solution into methanol. This produces a mass of irregularly shaped large solids rather than a powder which is preferred if not essential in the marketplace. Neither of the foregoing methods for recovering solid CPVC from its solution in liquid $Cl_2$ is economically desirable. The method of recovery of this invention provides a simple, convenient and economical method of obtaining solid CPVC in a desirable finely divided form.

SUMMARY OF THE INVENTION

It has been discovered that solid chlorinated poly(vinyl chloride), ("CPVC"), in a desirable particulate form, may be recovered from its solution in liquid $Cl_2$ (hereafter "CPVC-Cl syrup" for brevity) by adding the syrup to a large amount of a bifunctional liquid such as a halogenated lower alkane ("HLA") to provide a dual function, namely, (i) to dissolve $Cl_2$ in the syrup, and (ii) to precipitate the CPVC from the syrup as a finely divided solid.

It is therefore a general object of this invention to provide a process for recovering discrete solid finely divided particles of CPVC from a CPVC-Cl syrup by (a) adding the syrup to a bifunctional liquid, (b) recovering solid, particulate CPVC from the liquid mixture of bifunctional liquid and $Cl_2$ from which liquid mixture the CPVC is precipitated, and (c) separating the bifunctional liquid from the $Cl_2$ so that each may be reused.

It has further been discovered that the physical characteristics of CPVC precipitated by adding a CPVC-Cl syrup to a bifunctional liquid are different from those obtained by adding the bifunctional liquid to the syrup in an amount sufficient to precipitate the CPVC.

It is a specific object of this process to utilize a halogenated lower alkane ("HLA" for brevity) as the bifunctional liquid to recover a finely divided solid CPVC polymer from a CPVC-Cl syrup containing variable amounts of hydrogen chloride less than 10 percent by weight of the $Cl_2$, by adding the syrup to enough HLA to precipitate substantially all the CPVC from the mixture of CPVC solution and HLA, and thereafter discharging a three component mixture so formed into a separator for the discrete solid particles precipitated. The syrup is discharged into a precipitation tank under gravity, and the contents of the precipitation tank are discharged into a solids separator by gravity, providing a "cascade flow" of materials.

It has also been discovered that a cold CPVC-Cl syrup at a temperature in the range from about −80° C. to about 0° C., may be poured into a mass of 1,1,1-chlorodifluoro-2,2,2-dichlorofluoroethane (also referred to as "trichlorotrifluoroethane", and hereafter for brevity, as "TCTFE"), at a much higher temperature than the cold syrup without undue danger. Since the TCTFE substantially immediately dissolves the liquid $Cl_2$ and the CPVC is essentially insoluble in the $Cl_2$-TCTFE solution, the CPVC is precipitated as a finely divided particulate solid the size range of the particles being controllable by the process conditions under which the CPVC solution is added to the HLA.

BRIEF DESCRIPTION OF THE DRAWING

The foregoing and other objects and advantages of our invention will appear more fully from the following description, made in connection with the accompanying drawing, of a preferred embodiment of the invention, wherein.

DETAILED DESCRIPTION OF A PREFERRED EMBODIMENT

Figure 1:
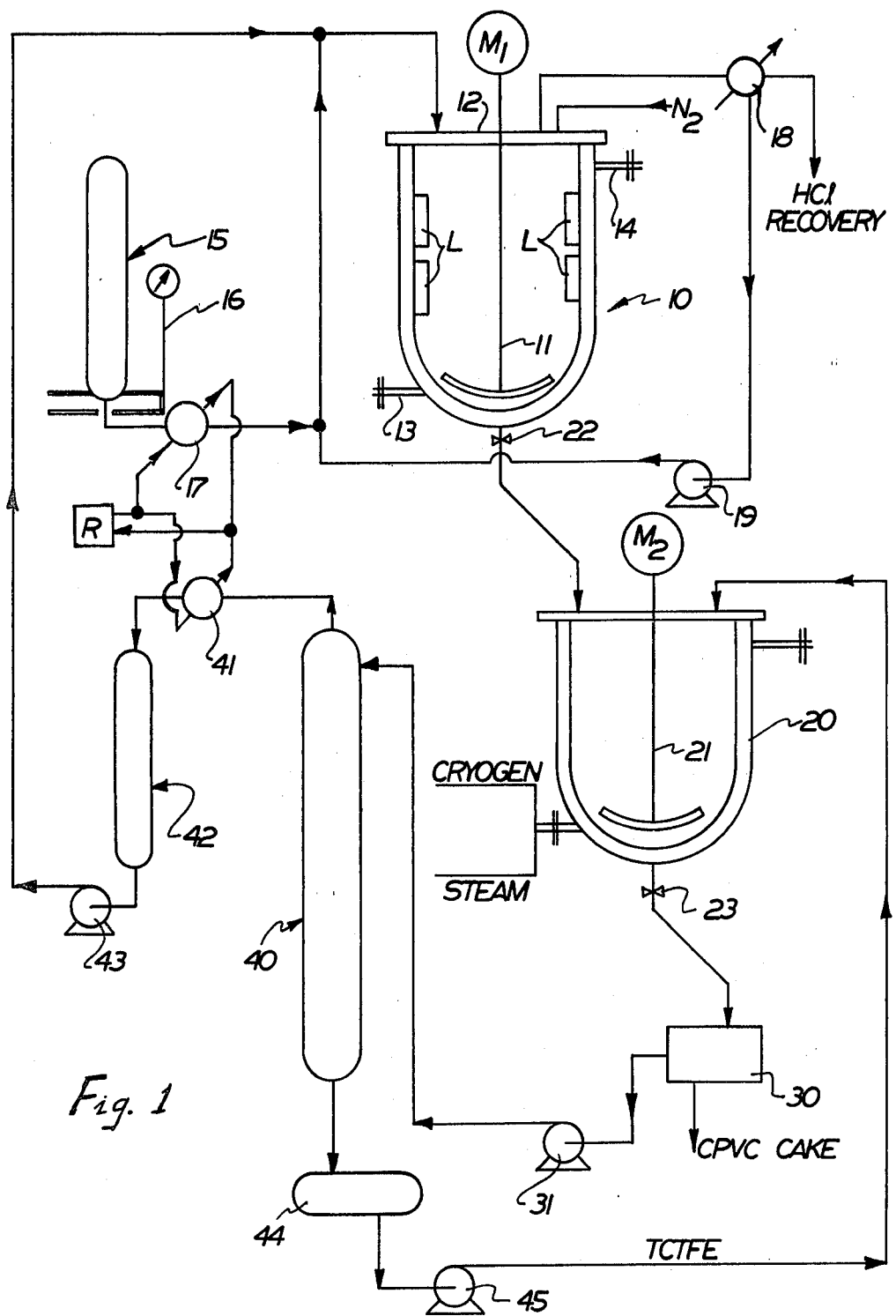
FIG. 1 is a process flow diagram schematically illustrating the steps of the process of the invention as carried out in pilot plant equipment designed for a batch process.

In a preferred embodiment this invention is directed to obtaining solid particulate CPVC from its solution in liquid $Cl_2$. By "CPVC" we refer to a chlorinated homopolymer of vinyl chloride, and still more particularly, to the homogeneously chlorinated poly(vinyl chloride) obtained by the reaction of solid poly(vinyl chloride), ("PVC"), with liquid $Cl_2$ in which it is suspended while it is exposed to actinic radiation (ultraviolet light). By "homogeneously chlorinated" we refer to the chlorination of PVC in such a way that when the Cl content of the CPVC is at least 65% by wt, the ratio of residual mols of PVC present as a block or run (sequence) of at least 3 vinyl chloride ("VC") units, to the mols of total VC units is less than 0.30. A detailed description of this liquid $Cl_2$ chlorination of PVC, and the CPVC formed thereby, will be found in copending patent application Ser. No. 228,538, now U.S. Pat. No. 4,350,798 referred to hereinbefore.

In the preferred embodiment described herein, a HLA is used, but any other bifunctional liquid may be used provided, under the operating conditions of the process, (i) liquid $Cl_2$ is substantially completely soluble in the bifunctional liquid, and (ii) CPVC is essentially insoluble in the bifunctional liquid. By 'substantially completely soluble' we mean a solubility of at least 20 parts of liquid $Cl_2$ per 100 parts of bifunctional liquid, and by 'essentially insoluble' we mean a solubility of less than about 100 parts per million (ppm). These essential criteria are best met by a HLA, the particular choice of the one used depending upon the process economics and the particular physical characteristics of the CPVC recovered.

Referring now to FIG. 1 there is schematically illustrated a jacketed reactor 10 made of suitable corrosion resistant material such as Hastalloy, designed to be operated at elevated pressure sufficient to ensure that liquid chlorine in the reactor is maintained in a liquid phase. The reactor 10 is equipped with ultraviolet lamps, identified by reference symbol L, of suitable intensity sufficient to photoilluminate solid porous macrogranules of PVC suspended in the liquid $Cl_2$ so as to cause the PVC to react with the $Cl_2$ and form CPVC which is dissolved in the liquid $Cl_2$. The reactor 10 is also equipped with a paddle-type stirrer 11 driven by an electric motor $M_1$ which keeps the suspension of PVC in liquid $Cl_2$ thoroughly agitated. In addition, the reactor is equipped with nozzles (not specifically identified) in its cover 12, to permit flushing it with an inert gas such as nitrogen when desired, and to carry off gaseous HCl generated during the chlorination reaction in which HCl some $Cl_2$ may be entrained. Nozzles 13 and 14 allow a low temperature heat exchange fluid ("cryogen") to be introduced into, and discharged from, the jacket of the reactor so as to maintain its contents at any preselected temperature at the pressure chosen for its operation.

The PVC to be chlorinated is preferably high molecular weight PVC homopolymer in the range from about 100,000 to about 1,000,000, and is preferably in the form of solid porous macrogranules. The particular process by which the solid PVC is formed, whether by suspension, emulsion or mass polymerization, is immaterial, the recovery of CPVC formed by chlorination of the PVC in liquid $Cl_2$ being effective so long as the CPVC is present as a solution in liquid $Cl_2$. Most preferred for chlorination is PVC produced in an aqueous suspension.

The photochlorination process of this invention is carried out at a temperature below the condensation point of $Cl_2$ as it is critical that the $Cl_2$ be absorbed within the macrogranules of PVC and that $Cl_2$ be present in the liquid state, under the pressure conditions of the reaction. By the term "absorbed" I refer to liquid chlorine held within a macrogranule, irrespective of whether the precise mechanism of holding the chlorine entails absorption, adsorption, chemisorption or physiosorption. It is more preferred that the temperature of reaction be substantially below the condensation point of $Cl_2$ at the pressure at which the reaction is to be carried out. This preferred temperature of reaction is in the range from about $-50°$ C. to about $50°$ C., though a temperature as high as $70°$ C. is operable. At atmospheric pressure this temperature of reaction is preferably in the range from about $-50°$ C. to about $-40°$ C., though lower temperatures as low as about $-80°$ C. may be employed. At 100 psig, the reaction temperature is about $25°$ C., and even higher pressures and correspondingly high temperatures may be used. However, above about 100 psig the benefits due to better diffusivity of liquid $Cl_2$ into the macrogranules of PVC begin to be vitiated by the economic penalties of operating at the higher pressures.

Liquid chlorine is absorbed into macrogranules of PVC by pumping the liquid into a mass of granules which is being mildly agitated so as to present fresh macrogranule surfaces to the liquid which is quickly absorbed into the macrogranules thus coming into contact with the primary particles which constitute a macrogranule. The amount of liquid $Cl_2$ charged to the mass of PVC to be chlorinated is in the range from about 5 parts to about 50 parts by weight chlorine per part by weight of PVC. In this range, and in the more preferred range of from about 5 to about 20 parts by weight liquid $Cl_2$ per part by weight of PVC, the mass appears to be a flowable liquid slurry.

Calculations indicate that 1.13 parts by weight liquid $Cl_2$ per part of PVC is sufficient to yield, theoretically, a CPVC with a chemically bound Cl content of 73.1%; but, unless a large excess of $Cl_2$ at least 5 times as much by weight as the amount of PVC is used, the PVC will not be homogeneously chlorinated. The precise amount of Cl actually introduced into the polymer after the chlorination reaction is completed will further depend upon the time of the reaction, the intensity of the ultraviolet radiation, and the physical and chemical characteristics of the PVC starting material. It will be evident that the physical and chemical characteristics of the CPVC product will vary according to the process conditions under which it was formed, and that a particular CPVC product may be obtained by routine and simple trial and error to stabilize all the variables.

Liquid $Cl_2$ is charged to the reactor from a first $Cl_2$ cylinder 15 on a weigh scale 16, the amount of $Cl_2$ charged depending mainly upon the amount of solid PVC to be batch-chlorinated in the reactor. Since a more preferred temperature for chlorination is in the range from about $-30°$ C. to about $25°$ C., and still more preferably in the range from about $-10°$ C. to about $15°$ C., it is generally desirable to cool the $Cl_2$ drawn from the cylinder 15 in a heat exchanger 17 through which a cryogen from a refrigeration system R is circulated. After a period of time during which liquid $Cl_2$ is absorbed into the PVC macrogranules and swells them, the lamps L are turned on. Agitation is continued until the desired degree of chlorination is achieved, that is, a preselected level of $Cl_2$ is introduced into the PVC. This level is determined by simple trial and error. The amount of $Cl_2$ vapor entrained with HCl evolved during reaction depends upon the process conditions chosen, particularly the pressure and temperature under which the reactor is operated. Where the entrainment of $Cl_2$ is significant, it is desirable to condense the $Cl_2$ vapors in a heat exchanger 18 through which cryogen from the refrigeration system R is circulated (connecting lines to R are not shown). The HCl vapors from the exchanger 18 are led to a HCl recovery system in which they are used as a reactant for another process. Liquid $Cl_2$ from exchanger 18 is returned by pump 19 to the reactor 10, to be reused.

After the chlorination is completed, valve 22 is opened and the resulting CPVC-Cl syrup is discharged into a precipitation tank 20 containing a liquid HLA at a temperature in the range from about −30° C. to about 50° C., and more preferably at a temperature in the range from about −10° C. to about 25° C. Tank 20 is preferably also jacketed for circulation of a heat exchange fluid, whether for cooling with cryogen or heating with steam (say), to control the temperature of the tank's contents; and, the tank is fitted with a paddle stirrer 21 driven by an electric motor $M_2$ to agitate the contents of the tank.

For acceptable operation of the process of this invention, any halogenated lower alkane may be used, provided that, under operating conditions of the process, the HLA meets the essential criteria for a bifunctional liquid set forth hereinbefore. A preferred HLA is chosen from among the chlorinated and/or fluorinated derivatives of a lower alkane having from 1 to about 6 carbon atoms, and more preferably from chlorinated and fluorinated derivatives of methane and ethane, and particularly monochlorodifluoromethane, monochloropentafluoroethane, dichlorodifluoromethane ("DCDFM"), 1,1-chlorodifluoro-2,2-chlorodifluoroethane, dichlorofluoromethane, tetrachlorofluoromethane, 1,1-bromodifluoro-2,2-bromodifluoroethane, 1,1,1-chlorodifluoro-2,2,2-dichlorofluoroethane ("TCTFE"), and 1,1,1-chlorodifluoro-2,2-dichlorofluoroethane, commercially available as Freon ® brand fluorocarbons from the E. I. duPont de Nemours Co. More preferred are those fluorocarbons having a boiling point in the range from about −30° C. to about 48° C., the particular fluorocarbon chosen depending upon its availability at reasonable cost, and the process conditions deemed most economical for its ability to dissolve liquid $Cl_2$ and be freed from it.

It has been found that an HLA derived from methane is not as easily freed from the CPVC formed as is an HLA derived from ethane. However, where freeing the HLA from the CPVC is not important, or where it may be desirable to have a significant concentration of the HLA remain with the CPVC, as for example where the CPVC solid cake is converted to a CPVC foam, the methane derivatives, and in particular, DCDFM, may be preferred.

When TCTFE (commercially available as Freon-113) is used, it is found that the contents of the preferably pressurized reactor 10 may be directly discharged into the precipitation tank containing TCTFE, causing $Cl_2$ to dissolve in the TCTFE and precipitating solid finely divided CPVC. The temperature of the TCTFE prior to the addition of the CPVC solution is not critical but it is preferred that it be no higher than about 50° C. It will be evident to one skilled in the art that an optimum temperature at which the components CPVC, liquid $Cl_2$ and TCTFE form a three-component mixture in the precipitation tank, will be determined by the economics of an energy balance.

It is not critical how much TCTFE is charged to the precipitation tank 20 before the CPVC-Cl syrup is added to the TCTFE to precipitate the CPVC, but it will be apparent that it is desirable to precipitate essentially all the CPVC. To do so effectively, essentially all the liquid $Cl_2$ should be dissolved in the TCTFE and enough TCTFE must be available to do this. When it is determined that essentially all the CPVC has been precipitated, valve 23 is opened and the contents of the precipitation tank are discharged to a suitable filter means such as a rotary filter 30, or alternatively to a centrifuge, to recover the CPVC as a filter cake of discrete finely divided solids. The filtrate is a solution of TCTFE and liquid $Cl_2$ which filtrate is pumped by a filtrate pump 31 to a recovery system for separating and recovering TCTFE and liquid $Cl_2$.

A preferred recovery system takes advantage of the considerable spread between the boiling points of TCTFE and liquid $Cl_2$ which allows $Cl_2$ to be easily stripped from the TCTFE in a $Cl_2$ stripper 40 provided with a suitable reboiler (not shown). Where dichlorodifluoromethane ("DCDFM" for brevity, or Freon-12) is used, the $Cl_2$ may be recovered by simple distillation under pressure. The separation effected in either case is excellent since no azeotrope is formed between chlorine and either DCDFM or TCTFE under desirable operating conditions. Overhead vapors of $Cl_2$ from the stripper are condensed in a heat exchanger 41 through which a cryogen from the refrigeration system R is circulated. Condensed liquid $Cl_2$ is held in a second cylinder 42 from which it may be returned by pump 43 to the reactor 10. The TCTFE is withdrawn as stripper bottoms and is held in an accumulator 44 from which it is returned by pump 45 to the precipitation tank for reuse in the process.

It may be desirable to add a small amount of HLA to the reactor during or soon after chlorination of the PVC is completed, simply to thin the syrup. Such small additions, much less than required to precipitate the CPVC from the syrup have no discernible effect on the physical characteristics of the solid CPVC precipitated by adding the syrup, even if thinned with TCTFE, to the TCTFE held in the precipitation tank. It is important in this process that, when CPVC is to be precipitated, the TCTFE be charged to the precipitation tank 20 before the syrup is discharged into it, or the morphology of the solid CPVC precipitated will not be the same as when the order is reversed. That is, the morphology of the CPVC recovered will be different if the TCTFE or other HLA is added to the syrup. The morphology of the solid CPVC affects its processability, and depending upon the processing requirements and properties sought in the finished article, the order of addition of syrup to solvent, or vice versa, is of critical importance.

In the following example, all 'parts' referred to are 'parts by weight' unless otherwise specified.

EXAMPLE

In a typical pilot plant run, 400 parts by wt of macrogranules of Geon ® 103EPF76 poly(vinyl chloride) resin, a general purpose resin containing about 56.7% by wt Cl, are charged to the jacketed reactor fitted with a paddle stirrer, and a bank of ultraviolet lights some or all of which may be turned on, as desired. Liquid cryogen such as a chilled brine solution, is circulated through the jacket of the reactor so as to keep chlorine in the liquid state at the pressure and temperature at which the chlorination reaction is to be carried out. After charging the reactor with PVC the reactor and its contents are subjected to vacuum, or flushed with an inert gas, preferably nitrogen. Thereafter, liquid chlorine is sprayed into the reactor while the macrogranules of PVC are being slowly churned by the paddle stirrer, until 8000 parts of liquid $Cl_2$ are charged.

The PVC macrogranules form a suspension which is easily agitated by the paddle stirrer in the reactor. After a period of about 30 mins it is found that most of the macrogranules have swollen. In this swollen condition they are ready for photochlorination which is effected by turning on the bank of ultraviolet lights. The lights are left on for as long as is required to produce the desired Cl content in the CPVC, this time being arrived at by trial and error for the particular temperature and pressure conditions of the reactor. The period of irradiation is generally in the range from about 4 to about 9 hours depending upon the particular physical characteristics of the reactor, of the PVC, the amount of PVC, and the intensity of the lights. A more preferred time for irradiation is in the range from about 5 to about 6 hours. While the suspension of PVC in liquid $Cl_2$ is being irradiated, it is continuously slowly stirred to facilitate evolution of HCl and $Cl_2$ from the reaction mass, and to permit more uniform chlorination of the PVC. For economic reasons the preferred temperature of operation is in the range from about 0° C. to about 35° C., and the chlorine evolved is condensed and returned to the reactor for another run; the HCl evolved is recovered for use in another reaction. At the end of the reaction, a thick syrupy solution of CPVC in liquid $Cl_2$ is obtained. HCl gas evolved during the chlorination reaction is removed through the reactor cover and disposed of by scrubbing with alkaline solution.

The precipitation tank 20 is charged with about five times as much TCTFE as there is syrupy solution in the reactor, and the TCTFE is preferably cooled below room temperature, preferably in the range from about 0° C. to about 10° C. by circulating cryogen in the tank's jacket. Then the solution from the reactor is discharged into the precipitation tank, with stirring. Solid CPVC commences to precipitate while the liquid $Cl_2$ forms a solution with the TCTFE, and because the overall heat balance for forming the three component mixture of solid CPVC, liquid $Cl_2$ and TCTFE is endothermic, the temperature of the mixture falls. If the temperature falls below about $-10°$ C. it is preferable to inject some steam into the jacket of the precipitation tank to raise the temperature into the preferred range. It is noted that the TCTFE-liquid $Cl_2$ solution turns dark yellow with the CPVC suspended in it, and that if there is an insufficient amount of TCTFE in the tank to dissolve all the liquid $Cl_2$ then vapors of $Cl_2$ will escape with the HCl.

After substantially all the solid CPVC is precipitated from solution, the contents of the precipitation tank are discharged to a rotary filter from which solid CPVC cake is removed and dried to rid it of the TCTFE-liquid $Cl_2$ solution which wets the cake. About 515 parts dry finely divided solid CPVC in the size range from 325 mesh and smaller, to 6 mesh and larger, U.S. Standard, are recovered indicating that essentially all the PVC has been converted.

The filtrate from the rotary filter is pumped to the upper section of the $Cl_2$ stripper which is operated at a temperature in the range from about $-10°$ C. to about 25° C. TCTFE bottoms from the stripper is recycled to the precipitation tank. $Cl_2$ vapors taken overhead are condensed and held in the cylinder 42 from which they may be recycled as desired. It is preferred to operate the stripper at as high a pressure as is economically justifiable and a correspondingly high temperature. It is most preferred to operate the stripper at a temperature in the range from about 0° C. to about 25° C. though substantially higher temperatures at least up to about 50° C. may be used.

We claim:

1. A process for recovering chlorinated poly(vinyl chloride) from a syrup of said chlorinated poly(vinyl chloride) dissolved in liquid chlorine, said process comprising,
   (a) adding said syrup to a halogenated lower alkane in which said liquid chlorine is substantially completely soluble,
   (b) precipitating said chlorinated poly(vinyl chloride) as discrete solid particles, and,
   (c) recovering said solid particles.

2. The process of claim 1 including in addition, obtaining a solution of said liquid chlorine in said halogenated lower alkane, and separating said solution into its liquid chlorine and alkane constituents.

3. The process of claim 2 wherein said solution is obtained by filtering said solid particles.

4. The process of claim 2 wherein said liquid chlorine and alkane constituents are recycled for reuse.

5. The process of claim 2 wherein said halogenated lower alkane is selected from the group consisting of chlorinated and/or fluorinated derivatives of a lower alkane having from about 1 to about 6 carbon atoms.

6. The process of claim 2 wherein separating said solution of liquid chlorine in alkane is effected by stripping said liquid chlorine from said alkane at a temperature in the range from about $-10°$ C. to about 25° C.

7. The process of claim 2 wherein said solid particles consist essentially of homogeneously chlorinated poly(vinyl chloride) in the size range from less than 325 mesh to larger than 6 mesh, U.S. Standard sieve sizes.

8. The process of claim 5 wherein said halogenated lower alkane is selected from the group consisting of chlorinated and fluorinated derivatives of methane and ethane having a boiling point in the range from about $-30°$ C. to about 48° C.

9. The process of claim 8 wherein said halogenated lower alkane is 1,1,1-chlorodifluoro-2,2,2-dichlorofluoroethane.

10. The process of claim 9 wherein said syrup is maintained at a temperature in the range from about $-30°$ C. to about 25° C., and is added to said 1,1,1-chlorodifluoro-2,2,2-dichlorofluoroethane at a temperature in the range from about $-30°$ C. to about 50° C.

* * * * *